(12) United States Patent
Kadikar (10) Patent No.: US 7,912,766 B2
(45) Date of Patent: Mar. 22, 2011

(54) LIMITED RISK WAGERING ENVIRONMENT

(76) Inventor: Vaibhav Dattataya Kadikar, London (GB)

( * ) Notice: Subject to any disclaimer, the term of this patent is extended or adjusted under 35 U.S.C. 154(b) by 359 days.

(21) Appl. No.: 12/137,547

(22) Filed: Jun. 12, 2008

(65) Prior Publication Data

US 2009/0313144 A1 Dec. 17, 2009

(51) Int. Cl.
*G07B 17/00* (2006.01)
(52) U.S. Cl. .................. 705/30; 705/1; 705/26; 705/35; 705/36; 709/217; 273/292; 463/25
(58) Field of Classification Search ............. 705/35, 705/36, 37, 38, 1, 26
See application file for complete search history.

(56) References Cited

U.S. PATENT DOCUMENTS

| 5,873,782 A | 2/1999 | Hall |
| 6,321,212 B1 | 11/2001 | Lange |
| 2005/0086143 A1 * | 4/2005 | Vlazny et al. ............ 705/35 |
| 2005/0171878 A1 | 8/2005 | Pennock |
| 2006/0265313 A1 * | 11/2006 | Fung et al. ............ 705/37 |

FOREIGN PATENT DOCUMENTS

WO WO2005/074617 A2 8/2005
* cited by examiner

*Primary Examiner* — Vanel Frenel
(74) *Attorney, Agent, or Firm* — Ash Tankha (57) ABSTRACT

Disclosed herein is a computer implemented method and system for rendering returns to users on an online platform. The online platform allows users to wager stakes for an event. The wagered stakes are pooled in a combined pot. Stake groups of users are created based on predetermined outcomes of the event. A winning stake group is determined out of stake groups at completion of a predetermined period of time. Time frame groups are identified from the winning stake group based on time of entry into the event. The time value appreciated returns to be rendered to the time frame groups are calculated. If the allotment of the time value appreciated return is possible, winning stakes and the time value appreciated returns are rendered to time frame groups. If the allotment of time value appreciated returns is not possible, the winning stakes are returned to the time frame groups.

19 Claims, 6 Drawing Sheets

LIMITED RISK WAGERING ENVIRONMENT

BACKGROUND

This invention, in general, relates to wagering with limited risk in an online environment. More particularly, this invention relates to rendering returns with limited risk to users on an online platform.

Most online platforms make money by charging a commission which is calculated as a percentage of net winnings for each bettor on each event, or market. Users whose activities have traditionally been restricted by bookmakers have found these sites a boon since the users are now able to place bets of a size unrestricted by the exchange. The odds available are usually better than those offered by bookmakers, notwithstanding the commission charged, since the middle man is eliminated. In various wagering establishments throughout the world, bookmakers provide wagering at fixed odds, i.e., set prices. The bookmakers then try to "balance their book" by making other bets to cover previous commitments. Therefore, this process involves risk; not only are the bookmakers not able to guarantee a particular rate of commission but can actually lose money on an event and even on a series of events.

A system that provides fixed odds is often referred to as a "fixed odds system". Many fixed odds systems have been proposed over the years. They have been computerized and have operated on the same principles as those used by bookmakers. Typically, these fixed odds systems use a pool of fixed price bets only. This pool is separate from the traditional parimutuel variable price totalized pool and provides fixed odds by attempting to balance the book in much the same way as a bookmaker would do. Consequently, the fixed odds systems cannot guarantee a particular rate of commission and have a risk of loss just like with that of a bookmaker. Inevitably the operation would lead to traditional problems such as a lesser rate of return than that provided by a parimutuel totalized system.

Hence, there is a need for an online platform to allow users to wager on an event with unrestricted returns and without fixed odd risk. There is also a need of providing wagering on the online platform with a limited risk of only the initial investment.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above mentioned need for an online platform to provide wagering with limited risk and without fixed odd risk.

The online platform allows users to deposit money in user accounts created for each of the users. The users wager stakes for an event on the online platform using the money deposited in the user accounts. The wagered stakes are pooled into a combined pot. The time of entry of the users into the event is recorded during the wagering of the stakes for the event on the online platform. Stake groups are created based on possible predetermined outcomes of the event. A winning stake group is determined from the created stake groups on knowing a final outcome out of the predetermined outcomes at completion of a predetermined period of time. The remaining stake groups form a losing stake group. Multiple time frame groups are identified from the winning stake group based on the time of entry into the event.

The possibility of allotment of time value appreciated returns to the time frame groups of the winning stake group is determined. The time value appreciated returns are calculated using stakes wagered by the losing stake group and a roll over existing from a previous event. Facilitation charges and processing charges are retrieved from the time value appreciated returns. The returns are then rendered to the users in the time frame groups.

When the allotment of the time value appreciated returns is not possible, the stakes wagered by the losing stake group and the roll over existing from the previous event roll over to a next event and the stakes wagered by the time frame groups of the winning stake group are returned to the users in the time frame groups. When the allotment of the time value appreciated returns is possible, the stakes wagered by the time frame groups and the time value appreciated returns are rendered to the time frame groups of the winning stake group. Furthermore, an aftermarket for the wagered stakes is provided to the users on the online platform, where the users can auction the wagered stakes in part or whole.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
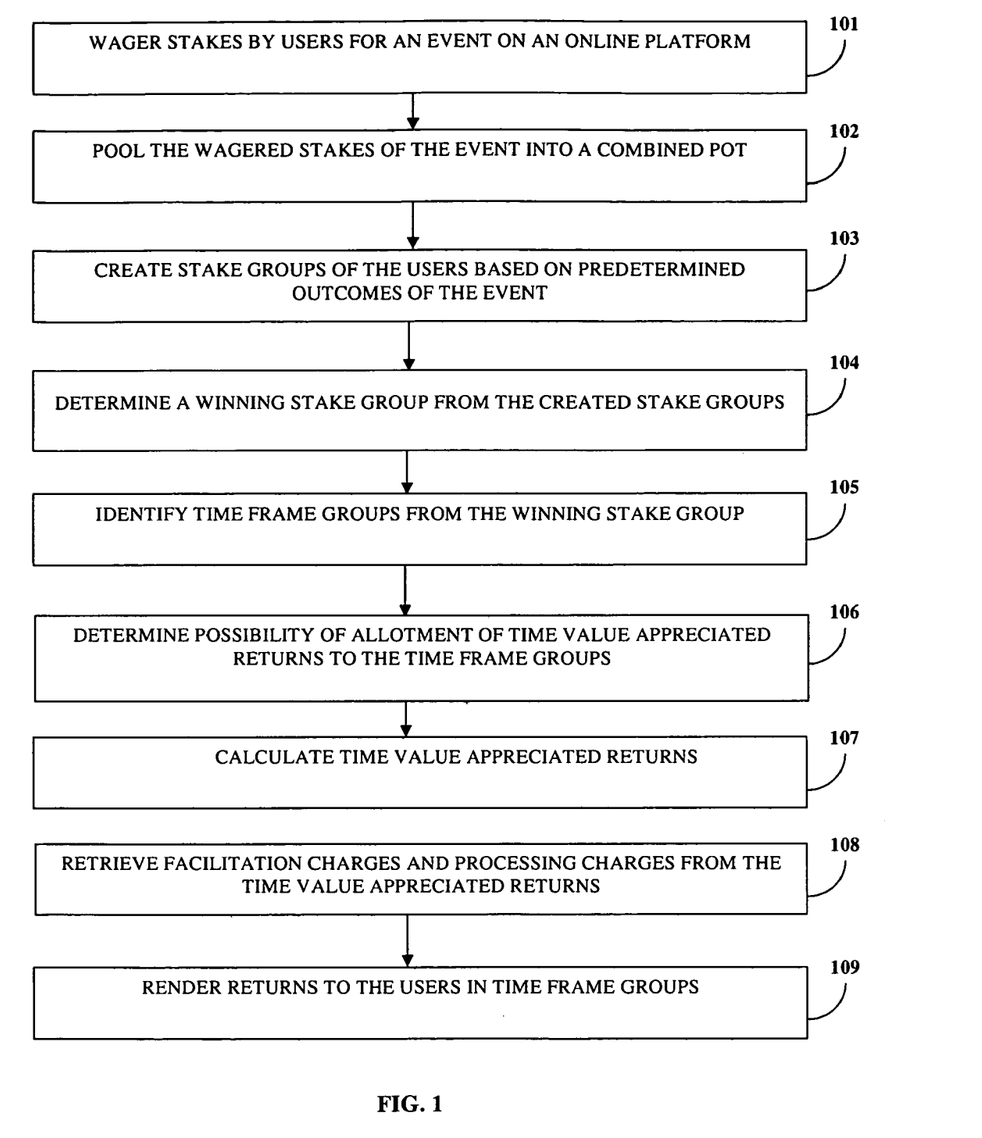
FIG. 1 illustrates a computer implemented method of rendering returns with limited risk to users on an online platform.

FIG. 1 illustrates a computer implemented method of rendering returns with limited risk to users 201 on an online platform. The users 201 register on the online platform and the online platform creates user accounts 401 for each of the users 201. The users 201 deposit money into the user accounts 401 and use the deposited money to wager stakes. The stakes are then wagered 101 in any event on the online platform. For example, the users 201 may wager the stakes on a sporting event, a financial market event, a political event, on world and entertainment events, etc. The time of entry of the users 201 into the event is recorded during time of wagering stakes for the event on the online platform. The users 201 are allowed to wager different stakes on one or more predetermined outcomes of the event. For example, there may be five different possible predetermined outcomes for one event of Dow Jones Industrial Average at the close of day. The five different possible predetermined outcomes may be a drop of more than 1%, a drop of more than 0.25% but less than 1%, in between −0.25% and +0.25%, increase of more than 0.25% but less than 1%, and an increase of more than 1%. All the wagered stakes in the event are pooled 102 into a combined pot 403.

The users 201 are allowed to view the status of the combined pot 403 on the online platform. Stake groups 402 are created 103 from the wagered stakes based on the predetermined outcomes of the event. On knowing a final outcome out of the predetermined outcomes at completion of a predetermined period of time, a winning stake group is determined 104 from the created stake groups 402. The remaining stake groups 402 form a losing stake group. Stakes wagered by the winning stake group are herein referred to as "winning stakes" and stakes wagered by the losing stake group are herein referred to as "losing stakes".

Time frame groups are then identified 105 from the winning stake group based on the time of entry of the users 201 into the event. The possibility of allotment of time value appreciated returns to the time frame groups is determined 106. The time value appreciated returns are calculated 107 using the losing stakes. If a roll over exists from a previous event, the roll over is added to the time value appreciated returns. Facilitation charges and processing charges are also retrieved 108 from the time value appreciated returns. The returns are rendered 109 to the time frame groups of the winning stake group. If the allotment of the time value appreciated returns is possible, the winning stakes and the time value appreciated returns are rendered to the users 201 in the time frame groups. If the allotment of the time value appreciated returns is not possible, the winning stakes are rendered to the users 201 in the time frame groups of the winning stake group and the time value appreciated returns are rolled over to a next event. The online platform thereby renders returns with limited risk to the users 201 on the online platform.

The method disclosed herein further provides an aftermarket to the users 201 to auction the wagered stakes on the online platform. The auction is conducted from time of closure of wagering stakes till the final outcome out of the predetermined outcomes is known at completion of the predetermined period of time. The aftermarket on the online platform enables users 201 to auction the wagered stakes in part or in whole to users 201 interested in buying the wagered stakes. The users 201 may use the aftermarket to sell the wagered stakes at a higher profit and for an emergency, for example, a financial crisis.

Figure 2:
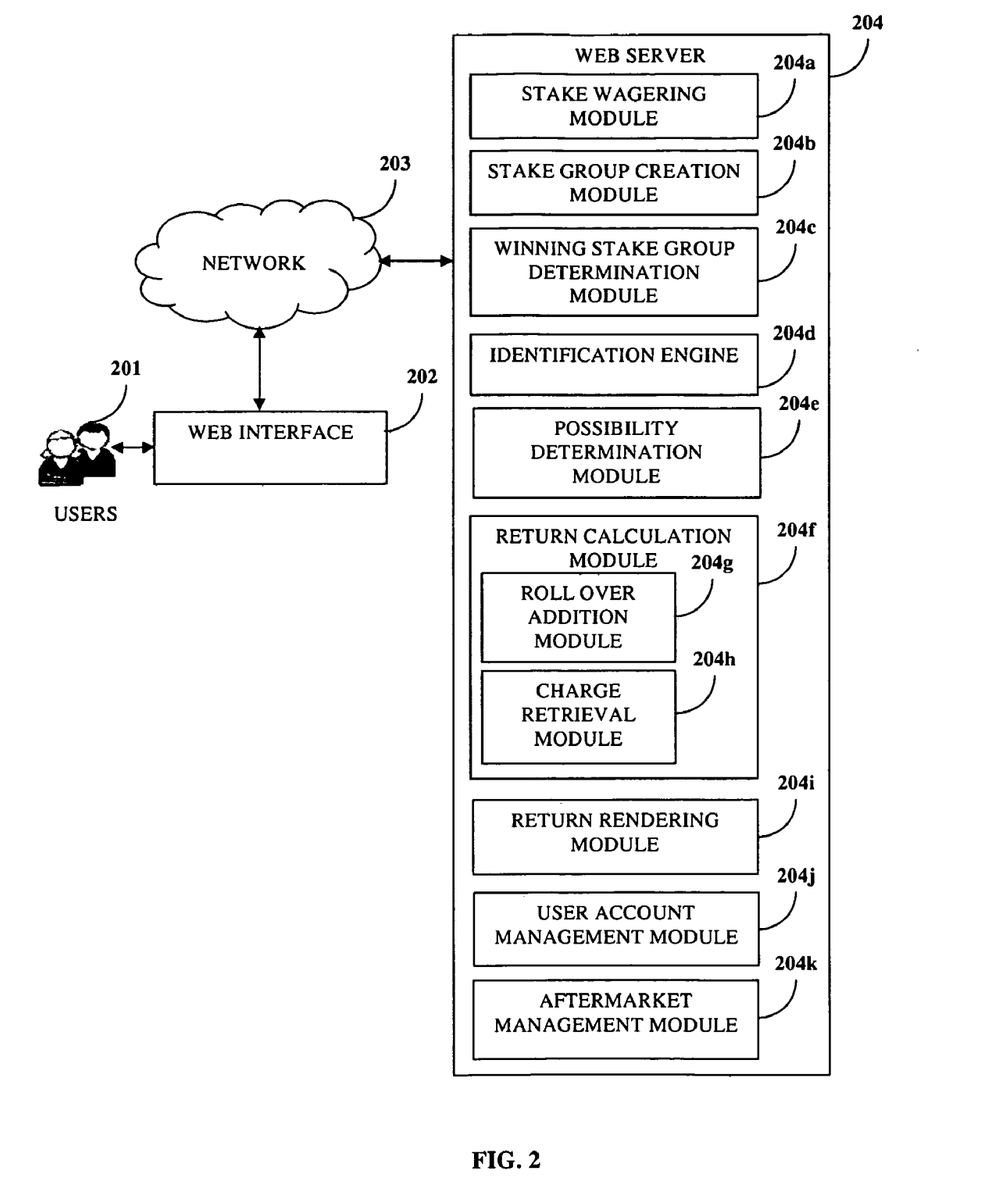
FIG. 2 illustrates a computer implemented system for rendering returns with limited risk to users on an online platform.

FIG. 2 illustrates a computer implemented system for rendering returns with limited risk to users 201 on an online platform. The system disclosed herein comprises a web interface 202 and a web server 204 of the online platform connected via a network 203. Users 201 may access the web interface 202 using a computing device. The computing device may be a personal computer, a laptop, a mobile phone, a personal digital assistant, etc. The web server 204 comprises a stake wagering module 204a, a stake group creation module 204b, a winning stake group determination module 204c, an identification engine 204d, a possibility determination module 204e, a return calculation module 204f, a return rendering module 204i, a user account management module 204j, and an aftermarket management module 204k.

The users 201 may register on the online platform to participate in different events via the web interface 202. The users 201 deposit money in user accounts 401 to wager stakes. The web interface 202 enables users 201 to wager stakes on the online platform. The stakes are wagered on the online platform by the users 201 using the stake wagering module 204a. The wagered stakes are pooled into a combined pot 403. The stake group creation module 204b creates stake groups 402 of the users 201 based on predetermined outcomes to the event. On knowing a final outcome out of the predetermined outcomes at completion of a predetermined period of time, the winning stake group determination module 204c determines a winning stake group from the created stake groups 402. The remaining stake groups 402 of the created stake groups 402 form a losing stake group. The identification engine 204d identifies time frame groups from the winning stake group. The time frame groups are identified based on the time of entry by the users 201 into the event. Time of entry of the users 201 into the event is recorded during wagering stakes for the event on the online platform.

The possibility determination module 204e determines possibility of allotment of the time value appreciated returns to the time frame groups of the winning stake group. The return calculation module 204f calculates the time value appreciated returns to be allotted to the time frame groups of the winning stake group. The return calculation module 204f calculates the time value appreciated returns using the losing stakes and the roll over existing from the previous event. The return calculation module 204f comprises a roll over addition module 204g and a charge retrieval module 204h. The roll over addition module 204g adds a roll over to the combined pot 403, if the roll over exists from the previous event and adds the roll over to a next event if the allotment of the time value appreciated returns is not possible. The roll over addition module 204g adds the losing stakes from the event to the next event if the allotment of the time value appreciated returns is not possible. The charge retrieval module 204h retrieves facilitation charges and processing charges from the time value appreciated returns. The facilitation charges and processing charges are retrieved from the time value appreciated returns. The return rendering module 204i renders the returns to the time frame groups of the winning stake group. If the allotment of the time value appreciated returns is possible, the return rendering module 204i renders the returns comprising the winning stakes and the time value appreciated returns to the users 201 in the time frame groups. If the allotment of the time value appreciated returns is not possible, the winning stakes are rendered to the users 201 in the time frame groups by the return rendering module 204i and the time value appreciated returns are rolled over to the next event.

The user account management module 204j manages user accounts 401 created for each of the users 201 on the online platform to deposit money for wagering stakes. The aftermarket management module 204k manages an aftermarket provided to users 201 on the online platform and auctions the wagered stakes via the web interface 202.

Figure 3:
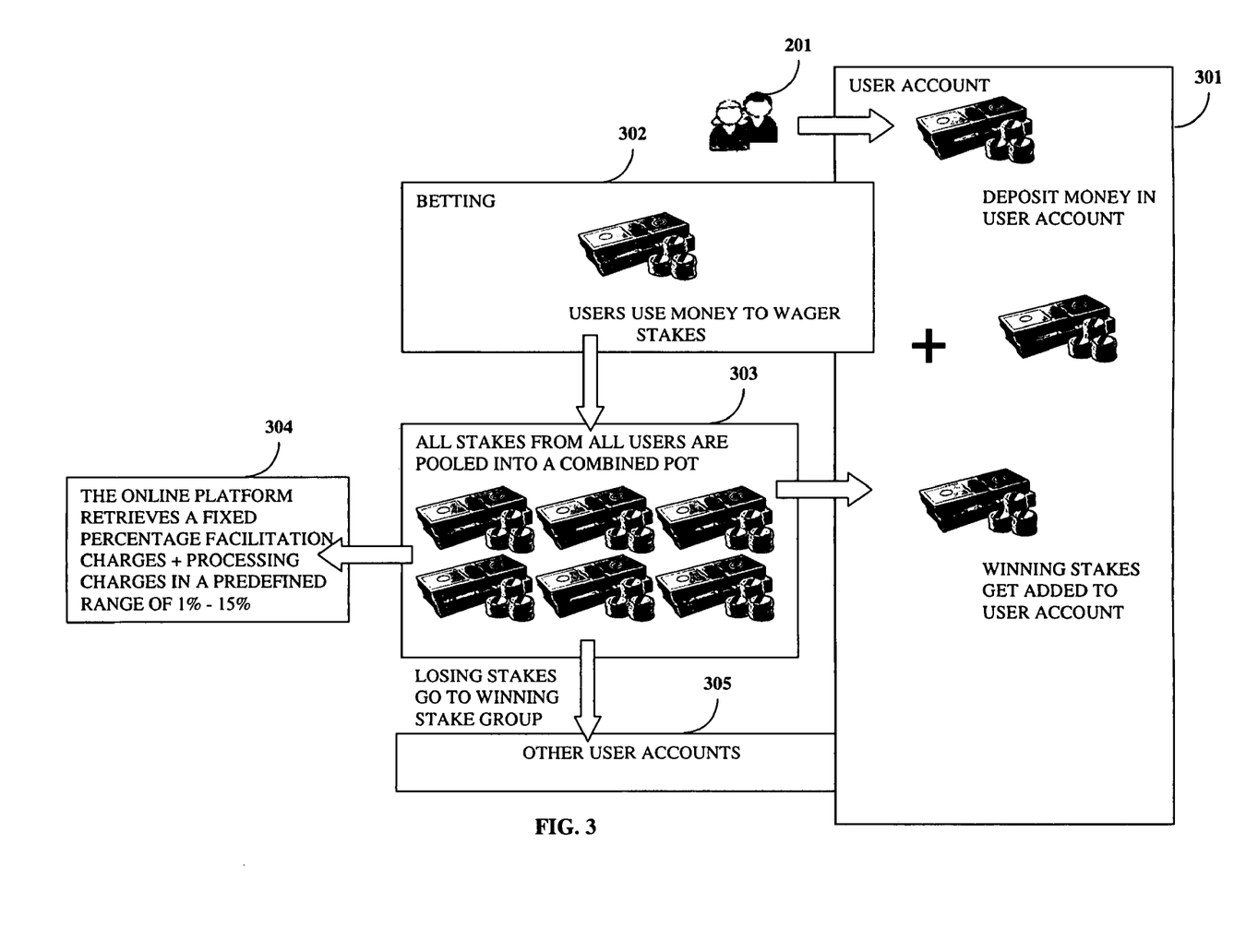
FIG. 3 exemplarily illustrates interaction between the user and the online platform.

FIG. 3 exemplarily illustrates interaction between the users 201 and the online platform. The users 201 register on the online platform and deposit 301 money in the user account 501. The users 201 use the deposited money to wager 302 stakes. The wagered stakes are pooled 303 into the combined pot 403. The online platform retrieves 304 a fixed percentage of facilitation charges and processing charges in a predefined range, for example, 1% to 15% depending on the outcome of the event and the size of the combined pot 403. Winning stakes get added 301 to user accounts 401 of the users 201 in the time frame groups. Losing stakes go 305 to other user accounts 401 of the time frame groups as the time value appreciated returns. The time value appreciated returns are distributed to the users 201 in the time frame groups based on the time of entry of the users 201 into the event.

Figure 4A:
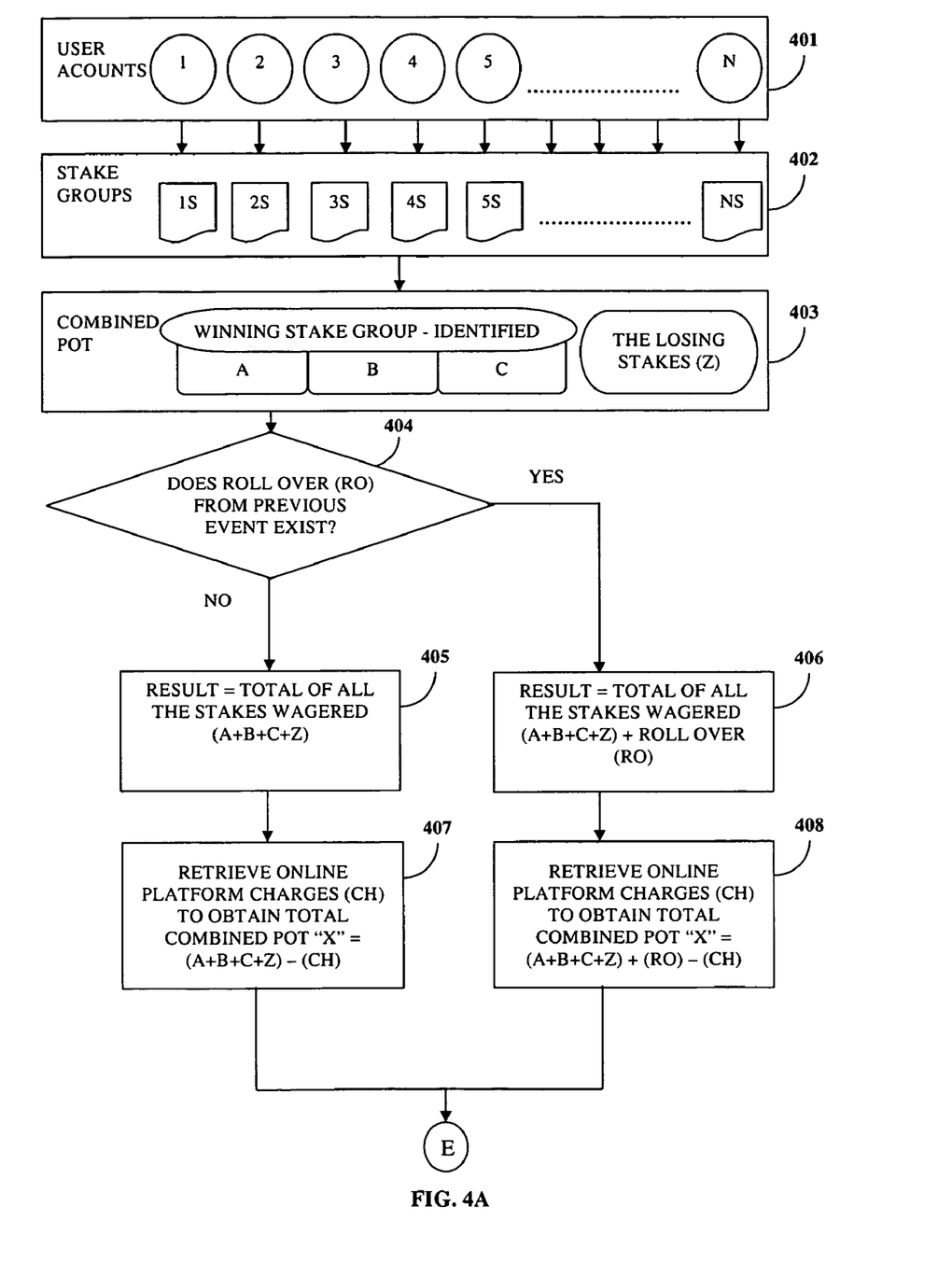
FIGS. 4A-4B exemplarily illustrates a flowchart for rendering returns to the users.
Figure 4B:
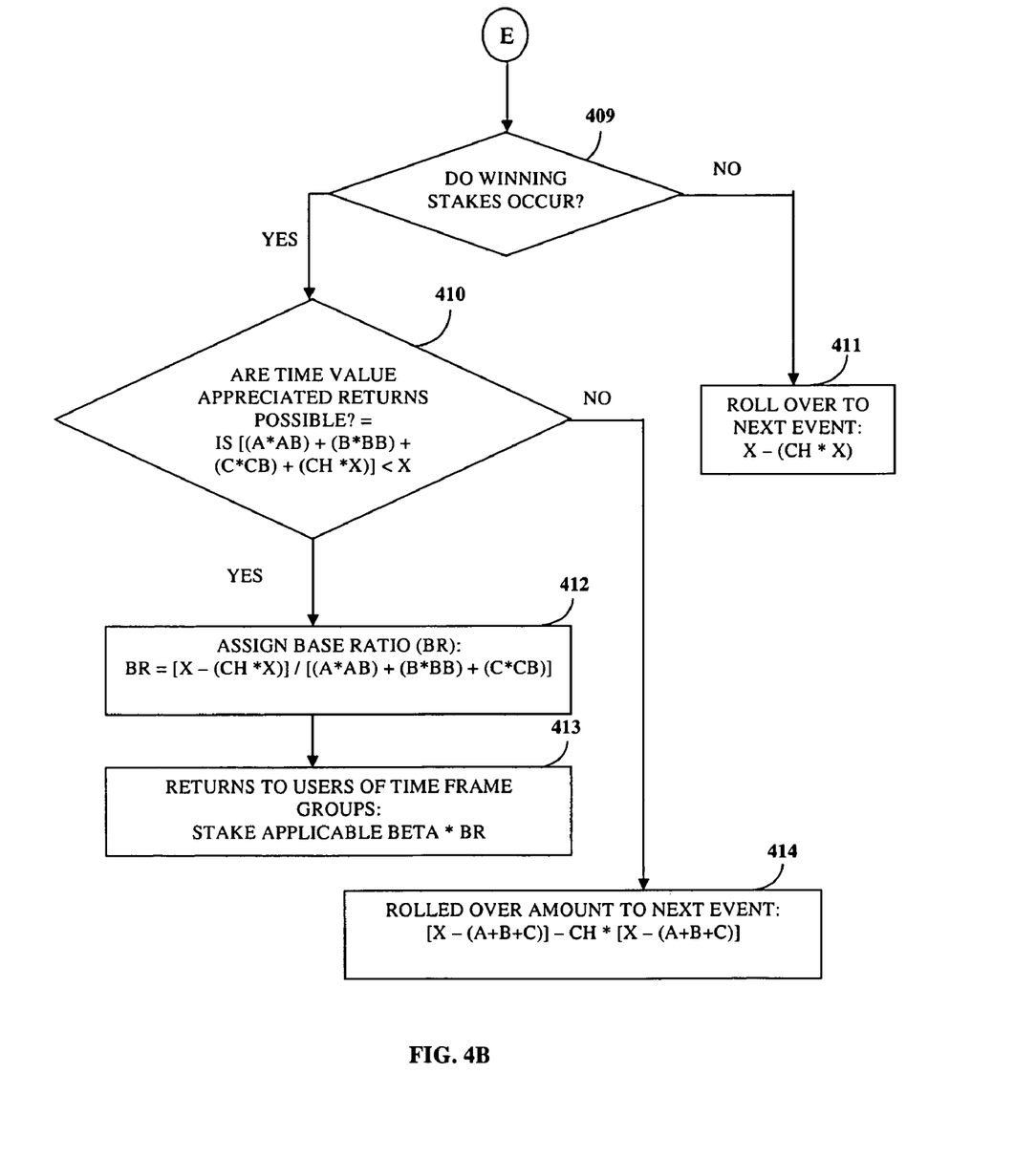

FIGS. 4A-4B exemplarily illustrates a flowchart for rendering returns to the users 201. FIG. 4A exemplarily illustrates calculation of the total combined pot 407 or 408, i.e., "X". Users 201 register on the online platform and deposit money in the user accounts 401. The user accounts 401 are created for the users 201 to wager stakes for the event from the deposited money on the online platform. The user accounts 401 are denoted as 1, 2, 3, 4, 5, ..., N. Stake groups 402 are created based on predetermined outcomes of the event. The stake groups 402 are denoted as 1S, 2S, 3S, 4S, 5S, ..., NS. The winning stake group is determined from the created stake groups 402. The time frame groups A, B, and C are then identified, from the winning stake group based on the time of entry of the users 201 into the event. Consider the stakes wagered by the time frame groups as "A", "B", and "C". The losing stakes identified by "Z" and the stakes wagered by the time frame groups of the winning stake group are combined in a combined pot 403. A check for the roll over from the previous event is performed. On existence 404 of the roll over from the previous event, the roll over amount "RO" is added to the combined pot 403 to obtain a total of all wagered stakes and the roll over amount i.e. A+B+C+Z+RO as a result 406. Online platform charges "CH" are retrieved to obtain the total combined pot 408 of, "X"=A+B+C+Z+RO−CH. When there is no 404 roll over existing from the previous event, the result 405 is the total of all wagered stakes i.e. the combined pot 403 A+B+C+Z. Online platform charges (CH) are then retrieved to obtain the total combined pot 407, i.e., "X"=A+B+C+Z−CH.

When winning stakes occur 409, the possibility of allotment of time value appreciated returns is determined 410 as illustrated in FIG. 4B. The possibility of allotment of time value appreciated returns is determined by checking and comparing a predefined expression with the total combined pot 407 or 408. The allotment of time value appreciated returns is possible 410 when the predefined expression is lesser than the total combined pot 407 or 408, i.e. [(A*AB)+(B*BB)+(C*CB)+(CH*X)]<X. A base ratio (BR) is then calculated and assigned 412 using the equation BR=[X−(CH*X)]/[(A*AB)+(B*BB)+(C*CB)], where AB, BB, and CB are the time value appreciation betas. The time value appreciation betas are assigned to the time frame groups A, B, and C based on the time of entry. The base ratio is a pro rata ratio of the total combined pot 407 or 408 to the sum of weighted winning stakes. The weighted winning stakes is the sum of the products of assigned time value appreciation betas namely AB, BB, and CB and the stakes wagered by the time frame groups A, B, and C respectively, i.e., [(A*AB)+(B*BB)+(C*CB)]. Returns 413 to each of the users 201 in the time frame groups are then calculated using product of stake applicable beta and the base ratio (BR). The stake applicable beta for A, B, and C is A*AB, B*BB, and C*CB respectively. The stake applicable beta provides an advantage to the users 201 entering the event ahead of the other users 201 for wagering the stakes.

The allotment of the time value appreciated returns is not possible 410 when the predefined expression is greater than the total combined pot 407 or 408, i.e. [(A*AB)+(B*BB)+(C*CB)+(CH*X)]>X. The winning stakes are rendered to the users 201 in the time frame groups and the losing stakes and the roll over from the previous event roll over to the next event. The roll over amount (RO) to the next event 414 may be calculated using the expression [X−(A+B+C)−CH*[X−(A+B+C)]. When winning stakes do not occur 409 for the event by any of the users 201, the total combined pot 407 or 408 minus the facilitation charges and processing charges are rolled over to the next event. The roll over is calculated 411 using the expression [X−(CH*X)].

Consider an example where users 201, Aaron, Ben, and Caesar wager stakes of amounts $10,000, $30,000, and $40,000 on the online platform. Consider a roll over of $20,000 exists from a previous event. All the wagered stakes are pooled into a total combined pot 407 or 408, i.e., X. The total combined pot 407 or 408 is then $100,000. Ben and Aaron win the event and form the winning stake group. Caesar's wager of $40,000 forms the losing stake group. Consider the facilitation charges and processing charges to be 10%. The allotment of the time value appreciated returns may be determined by the predefined expression [(A*AB)+(B*BB)+(CH*X)]<X, where AB and BB are the time value appreciation betas for Aaron and Ben respectively. Consider AB is 1.25 for Aaron and BB is 1.50 for Ben since Ben joined the event ahead of Aaron. The predefined expression therefore becomes
[10,000*1.25+30,000*1.50+0.1*100,000]<100,000 i.e., $67,500<$100,000. Therefore, the allotment of time value appreciated returns is possible for Aaron and Ben.

Consider weighted winning stakes to be [(A*AB)+(B*BB)], i.e., $57,500. Consider the base ratio calculated as BR=[X−(CH*X)]/[(A*AB)+(B*BB)] is 1.5652. The returns rendered to Ben and Aaron is calculated using the stake applicable beta and the base ratio, to give Ben returns of $70,435 and Aaron returns of $19,565. The total returns rendered to Aaron and Ben is therefore $90000, while the remaining $10,000 in the total combined pot 407 or 408 has been retrieved as the facilitation charges and the processing charges.

Figure 5:
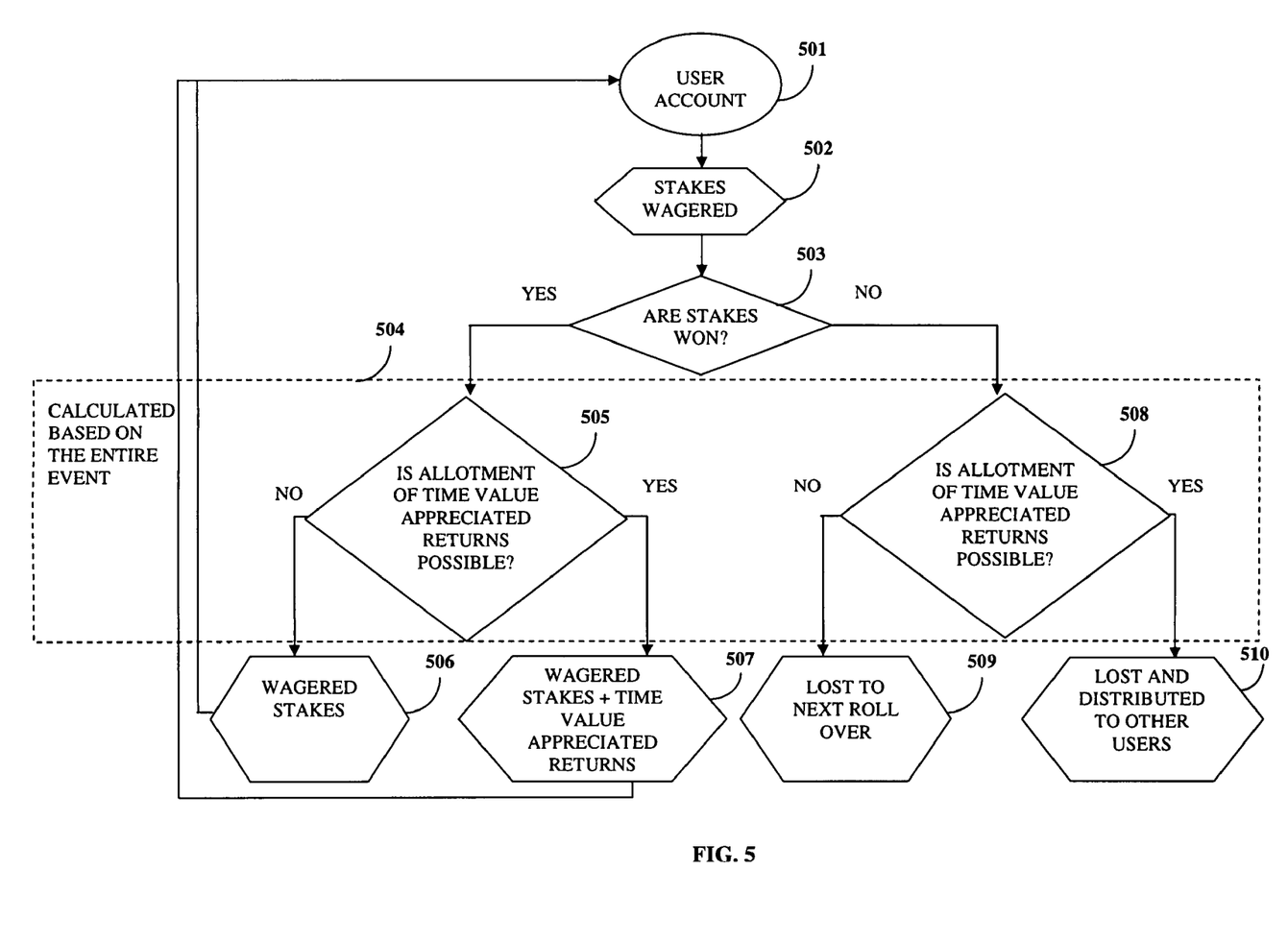
FIG. 5 exemplarily illustrates a flowchart for determining the returns to be allotted to an individual user.

Consider another example where a user, for example Tony registers on the online platform. Tony deposits money into the user account 501 created. Tony wagers stakes 502 using the money deposited in the user account 501. The stakes wagered 502 are pooled into the combined pot 403 along with the stakes of other users 201 in the event. When Tony wins 503 stakes and is a part of the winning stake group, the possibility of allotment of time value appreciated returns is determined. Tony receives 506 the wagered stakes when the allotment of the time value appreciated returns is not possible 505. Tony receives 507 the wagered stakes and the time value appreciated returns when the allotment of the time value appreciated returns is possible 505. The returns are deposited in the user account 501 in both cases. When Tony does not 503 win stakes, the possibility of allotment of time value appreciated returns is determined. When allotment of time value appreciated returns is not possible 508 for Tony, the wagered stakes are lost 509 to the next event as roll over. When time value appreciated returns are possible 508 for Tony as illustrated in FIG. 5, Tony's wagered stakes are lost 510 and distributed as the time value appreciated returns to the users 201 in the time frame groups of the winning stake group. The time value appreciated returns are calculated 504 based on the entire event. The online platform thereby enables Tony to wager stakes and receive the returns without fixed odd risk.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A 'processor' means any one or more microprocessors, Central Processing Unit (CPU) devices, computing devices, microcontrollers, digital signal processors or like devices. The term 'computer-readable medium' refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A computer implemented method of rendering returns with limited risk to a plurality of users on an online platform, comprising the steps of:
    wagering stakes by said users for an event on said online platform, wherein said wagered stakes of said event are pooled into a combined pot;
    creating stake groups of the users based on mutually exclusive predetermined outcomes of the event;
    determining a winning stake group from said created stake groups on knowing a final outcome out of said predetermined outcomes at completion of a predetermined period of time, wherein remaining stake groups form a losing stake group;
    identifying a plurality of time frame groups from said winning stake group, wherein said time frame groups are identified based on time of entry of each of the users in the winning stake group into the event, wherein said time of entry of the users into the event is recorded during said wagering of said stakes for the event on the online platform;
    calculating said time value appreciated returns by assigning time value appreciation betas to said stakes wagered by said time frame groups of said winning stake group, wherein said time value appreciation betas represent predetermined weights based on the time of entry of the time frame groups, wherein facilitation charges and processing charges are retrieved from the combined pot;
    determining possibility of allotment of time value appreciated returns to the time frame groups of the winning stake group based on said combined pot and a roll over if existing from a previous event;
    rendering said returns to the users in the time frame groups of the winning stake group, wherein said rendered returns comprise stakes wagered by the time frame groups and the time value appreciated returns if said allotment of the time value appreciated returns is possible, further wherein the rendered returns comprise said stakes wagered by the time frame groups if the allotment of the time value appreciated returns is not possible;
    whereby the online platform enables the users in the time frame groups to receive the returns without fixed odd risk and renders the returns with limited risk to the users on the online platform.

2. The computer implemented method of claim 1, further comprising a step of creating user accounts on the online platform for the users, wherein the users wager the stakes from money deposited in said created user accounts.

3. The computer implemented method of claim 1, further comprising a step of allowing the users to wager different stakes on one or more of the predetermined outcomes of the event.

4. The computer implemented method of claim 1, further comprising a step of providing an aftermarket for the wagered stakes to the users, wherein the wagered stakes are auctioned on the online platform.

5. The computer implemented method of claim 4, wherein said auctioning of the wagered stakes in said aftermarket is conducted from time of closure of wagering stakes till said final outcome out of the predetermined outcomes is known on said completion of said predetermined period of time.

6. The computer implemented method of claim 1, wherein the returns comprising the stakes wagered by the time frame groups of the winning stake group and the time value appreciated returns are estimated and rendered to each of the users in the time frame groups, if the allotment of the time value appreciated returns is possible.

7. The computer implemented method of claim 1, wherein the stakes wagered by the time frame groups of the winning stake group are rendered to the users in the time frame groups and the time value appreciated returns are rolled over to a next event, if the allotment of the time value appreciated returns is not possible.

8. The computer implemented method of claim 1, wherein the possibility of allotment of the time value appreciated returns to the time frame groups of the winning stake group is determined by comparing a sum of said time value appreciation returns for the users in the time frame groups with a sum of said combined pot and said roll over existing from said previous event.

9. The computer implemented method of claim 1, further comprising determining and assigning a base ratio to said time value appreciated returns, if said allotment of the time value appreciated returns is possible, to determine final returns to the users in the time frame groups of the winning stake group, wherein said base ratio is a pro rata ratio of the combined pot after retrieving the facilitation and processing charges to a sum of said time value appreciated returns.

10. The computer implemented method of claim 9, further comprising calculating final odds for said stakes wagered by each of the users in the winning stake group, wherein said final odds for each of the users in the winning stake group is a product of one of the assigned time value appreciation betas and said base ratio.

11. A computer implemented system for rendering returns with limited risk to a plurality of users on an online platform, comprising:
  a web interface for enabling users to wager stakes for an event on said online platform;
  a web server, comprising:
    a stake wagering module for wagering said stakes made by the users for said event on the online platform, wherein said wagered stakes of the event are pooled into a combined pot;
    a stake group creation module for creating stake groups of the users based on predetermined outcomes of the event;
    a winning stake group determination module for determining a winning stake group from said created stake groups on knowing a final outcome out of said predetermined outcomes at completion of a predetermined period of time, wherein remaining stake groups form a losing stake group;
    an identification engine for identifying a plurality of time frame groups from said winning stake group, wherein said time frame groups are identified based on time of entry of each of the users in the winning stake group into the event, wherein said time of entry of the users into the event is recorded during said wagering of the stakes for the event on the online platform;
    a possibility determination module for determining possibility of allotment of time value appreciated returns to the time frame groups of the winning stake group;
    a return calculation module for calculating said time value appreciated returns by assigning time value appreciation betas to said stakes wagered by said time frame groups of said winning stake group, wherein said time value appreciation betas represent predetermined weights based on the time of entry of the time frame groups; and
    a return rendering module for rendering said returns to the users in the time frame groups.

12. The computer implemented system of claim 11, wherein said return rendering module renders the returns comprising stakes wagered by the time frame groups of the winning stake group and the time value appreciated returns to the users in the time frame groups if said allotment of the time value appreciated returns is possible, further wherein the return rendering module renders the returns comprising said stakes wagered by the time frame groups of the winning stake group to the users in the time frame groups if the allotment of the time value appreciated returns is not possible.

13. The computer implemented system of claim 11, wherein said return calculation module comprises a roll over addition module for adding said roll over existing from a previous event to said combined pot and adding the roll over to a next event if the allotment of the time value appreciated returns is not possible.

14. The computer implemented system of claim 13, wherein said roll over addition module adds said stakes wagered by the losing stake group from the event to said next event, if the allotment of the time value appreciated returns is not possible.

15. The computer implemented system of claim 11, wherein said return calculation module comprises a charge retrieval module for retrieving facilitation charges and processing charges from the combined pot.

16. The computer implemented system of claim 11, wherein said return calculation module calculates the returns to be distributed to each of the users in the time frame groups of the winning stake group based on said possibility of said allotment of the time value appreciated returns to the time frame groups.

17. The computer implemented system of claim 11, further comprising a user account management module for managing user accounts created for the users on the online platform, wherein said created user accounts comprise money deposited by the users for wagering the stakes.

18. The computer implemented system of claim 11, further comprising an aftermarket management module for managing an aftermarket provided to the users for the wagered stakes on the online platform, wherein the wagered stakes are auctioned via said web interface.

19. A computer program product comprising computer executable instructions embodied in a computer-readable medium, wherein said computer program product comprises:
  a first computer parsable program code for wagering stakes by a plurality of users for an event on an online platform;
  a second computer parsable program code for creating stake groups of said users based on predetermined outcomes of said event;
  a third computer parsable program code for determining a winning stake group from said created stake groups on knowing a final outcome out of said predetermined outcomes at completion of a predetermined period of time, wherein remaining stake groups form a losing stake group;
  a fourth computer parsable program code for identifying a plurality of time frame groups from said winning stake group;
  a fifth computer parsable program code for determining possibility of allotment of time value appreciated returns to said time frame groups of the winning stake group;
  a sixth computer parsable program code for calculating said time value appreciated returns by assigning time value appreciation betas to said stakes wagered by said time frame groups of said winning stake group, wherein said time value appreciation betas represent predetermined weights based on the time of entry of the time frame groups; and a seventh computer parsable program code for rendering returns to users in the time frame groups, wherein said rendered returns comprise stakes wagered by the time frame groups and the time value appreciated returns if said allotment of the time value appreciated returns is possible, further wherein the rendered returns comprise said stakes wagered by the time frame groups if the allotment of the time value appreciated returns is not possible.

* * * * *